(12) United States Patent
Guo et al.

(10) Patent No.: US 9,886,878 B2
(45) Date of Patent: Feb. 6, 2018

(54) PIXEL ARRAY, DISPLAY DRIVING METHOD, DISPLAY DRIVING DEVICE AND DISPLAY DEVICE

(71) Applicants: Boe Technology Group Co., LTD., Beijing (CN); Beijing Boe Optoelectronics Technology Co., LTD., Beijing (CN)

(72) Inventors: Renwei Guo, Beijing (CN); Xue Dong, Beijing (CN); Xi Chen, Beijing (CN)

(73) Assignees: BOE TECHNOLOGY GROUP CO., LTD., Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 69 days.

(21) Appl. No.: 14/907,202

(22) PCT Filed: Aug. 12, 2015

(86) PCT No.: PCT/CN2015/086759
§ 371 (c)(1),
(2) Date: Jan. 22, 2016

(87) PCT Pub. No.: WO2016/150076
PCT Pub. Date: Sep. 29, 2016

(65) Prior Publication Data
US 2017/0039911 A1    Feb. 9, 2017

(30) Foreign Application Priority Data

Mar. 25, 2015  (CN) .......................... 2015 1 0133501

(51) Int. Cl.
*H01L 27/32* (2006.01)
*G09G 3/00* (2006.01)
(Continued)

(52) U.S. Cl.
CPC ......... *G09G 3/003* (2013.01); *G02B 27/2214* (2013.01); *G02F 1/1362* (2013.01);
(Continued)

(58) Field of Classification Search
CPC combination set(s) only.
See application file for complete search history.

(56) References Cited

FOREIGN PATENT DOCUMENTS

| CN | 103926698 | 7/2014 |
| CN | 103926698 A | 7/2014 |

(Continued)

OTHER PUBLICATIONS

Office Action in Chinese Application No. 201510133501.1 dated Aug. 31, 2016, with English translation. 10 pages.
(Continued)

*Primary Examiner* — Minh Phan
(74) *Attorney, Agent, or Firm* — Blakely Sokoloff Taylor & Zafman LLP

(57) ABSTRACT

A pixel array, a display driving method, a display driving device and a display device are described. The pixel array comprises a plurality of columns of subpixel groups. Each column of subpixel group comprises M×N subpixels, where N is the number of colors of subpixels, and M is an integer equal or greater than 3. Directions in which subpixels of the subpixel groups in odd columns and subpixels of the subpixel groups in even columns are twisted respectively being opposite in a column direction. The pixel array is suitable for application of Pentile technologies under 2D/3D display mode.

20 Claims, 13 Drawing Sheets

(51) Int. Cl.
    *G02F 1/1362*    (2006.01)
    *G02B 27/22*    (2006.01)
    *G09G 3/20*    (2006.01)
    *G09G 5/10*    (2006.01)

(52) U.S. Cl.
    CPC ............ *G09G 3/2003* (2013.01); *G09G 5/10* (2013.01); *G09G 2300/0426* (2013.01); *G09G 2300/0443* (2013.01); *G09G 2300/0452* (2013.01); *G09G 2320/0646* (2013.01); *G09G 2340/0457* (2013.01); *G09G 2340/10* (2013.01)

(56) References Cited

FOREIGN PATENT DOCUMENTS

| | | |
|---|---|---|
| CN | 103945203 | 7/2014 |
| CN | 104112763 A | 10/2014 |
| CN | 104658433 A | 5/2015 |
| CN | 104680949 | 6/2015 |
| EP | 2506071 A2 | 10/2012 |
| JP | 2001136375 | 5/2001 |
| JP | 2014026010 A | 2/2014 |
| KR | 100835112 | 5/2008 |

OTHER PUBLICATIONS

International Search Report and Written Opinion with English Language Translation, dated Dec. 9, 2015, Application No. PCT/CN2015/086759.

PIXEL ARRAY, DISPLAY DRIVING METHOD, DISPLAY DRIVING DEVICE AND DISPLAY DEVICE

FIELD OF THE INVENTION

The present disclosure relates to the field of display technologies, in particular to a pixel array, a display driving method, a display driving device and a display device.

BACKGROUND OF THE INVENTION

In conventional liquid crystal display device or organic light emitting diode display device, each pixel renders colors by mixing light with several subpixels. For example, each pixel may consist of a red subpixel, a green subpixel, and a blue subpixel. To improve a visual effect, increasingly high requirements have been posed to resolutions of display devices, which entails subpixels to become smaller and smaller in size. However, size of subpixels cannot be reduced infinitely due to process limitations. Given a certain size of subpixel, a display device of Pentile mode has been proposed in the art to improve the display effect.

In a display device of Pentile mode, a single pixel may consists of only two subpixels of "red-green" or "blue-green". During actual image displaying, a pixel in the display device of Pentile mode may "borrow" another color from its adjacent pixels to render three primary colors. Therefore, in a display device of Pentile mode, partial subpixels are "shared", which reduces the number of sub-pixels, achieves an effect of simulating a high resolution under a low resolution, and achieves a higher resolution than an actual resolution in terms of visual effect.

Naked eye 3D mode is a kind of 3D display mode suitable for display devices of large sizes, which distinguishes between information entering a viewer's left eye and information entering the viewer's right eye (comprising a first view and a second view) by setting gratings so that the viewer may experience 3D effects. However, because the naked eye 3D mode has a light barrier grating design, PPI (Pixel per inch) will be significantly reduced, sometimes by half, during being observed, which degrades 3D visual effects. How to increase visual resolutions of a naked eye 3D display device has become a problem to be solved in the art.

SUMMARY OF THE INVENTION

In embodiments of the present disclosure, a pixel array, a display driving method, a display driving device and a display device are provided, which overcomes or obviates shortcomings or problems relating to the above mentioned display technologies. A pixel array in accordance with embodiments of the present disclosure is suitable for application of Pentile technologies under 2D/3D display mode.

To this end, the present disclosure provides a pixel array, comprising a plurality of columns of subpixel groups, each column of subpixel groups comprising M×N subpixels, where N is the number of colors of subpixels, and M is an integer equal or greater than 3;

directions in which subpixels of the subpixel groups in odd columns and subpixels of the subpixel groups in even columns are twisted respectively being opposite in a column direction.

Optionally, shapes of the subpixels are parallelogram.

Optionally, acute angles of the parallelogram are in a range of 70 degree to 90 degree.

Optionally, acute angles of the parallelogram are in a range of 82 degree to 85 degree.

Optionally, a length ratio of a side of a subpixel in the column direction to a side of the subpixel not in the column direction is $$\left[\frac{1}{2}, 1\right].$$

Optionally, there are a predetermined number of subpixels per unit pixel element area, and the predetermined number is lower than the number of colors of subpixels comprised in the pixel array. Preferably, when the pixel array contains three subpixel colors, the predetermined number may be $$2, \frac{3}{2}$$

or 1.

Optionally, the value of N is 3, and the pixel array is a triangular pixel array.

Optionally, length of a side of the subpixel in the column direction is a, and the subpixel groups in odd columns and the subpixel groups in even columns are staggered by $$\frac{1}{2}a$$

in the column direction.

To this end, the present disclosure also provides a display driving method for driving a 2D display device comprising an pixel array described above according to the present disclosure, and the display driving method comprises:

segmenting an image to be displayed into a plurality of theoretical pixel elements and determining color components for colors in each theoretical pixel element; and setting luminance for each subpixel based on color components for color of the subpixel in theoretical pixel elements that are covered by a first preset sampling region corresponding to the subpixel.

Optionally, length of a side of a subpixel in a column direction is a, span of the subpixel in a row direction is b, the subpixel groups in odd columns and the subpixel groups in even columns are staggered by $$\frac{1}{2}a$$

in the column direction, and the first preset sampling region is a rhombic sampling region;

wherein four vertexes of the rhombic sampling region for the subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively.

Optionally, the step of setting luminance for each subpixel based on color components for color of the subpixel in theoretical pixel elements that are covered by the rhombic sampling region corresponding to the subpixel comprises:

for each subpixel, determining overlapping areas between its corresponding rhombic sampling region and each theoretical pixel element covered by the rhombic sampling region and color components for the color of the subpixel in said each theoretical pixel element; calculating products of overlapping areas corresponding to said each theoretical pixel element and respective determined color components; and setting the luminance of the subpixel based on a sum of the products and an area of the rhombic sampling region.

To this end, the present disclosure also provides a display driving device for driving a display device comprising a pixel array described above, the display driving device comprising:

a first image pixel segmenting unit being configured to segment a image to be displayed into a plurality of theoretical pixel elements and determine color component for colors in each theoretical pixel element; and a first luminance setting unit being configured to set luminance for each subpixel based on color components for color of the subpixel in theoretical pixel elements that are covered by a first preset sampling region corresponding to the subpixel.

Optionally, when length of a side of the subpixel in the column direction is a, the subpixel groups in odd columns and the subpixel groups in even columns are staggered by $$\frac{1}{2}a$$

in the column direction, and span of the subpixel in a row direction is b, the first preset sampling region is a rhombic sampling region;

wherein four vertexes of the rhombic sampling region for the subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively.

To this end, the present disclosure also provides a display driving method for driving a 3D display device comprising a grating array and a pixel array described above, the subpixel groups in odd columns being first view pixel groups used for a first view to be displayed; the subpixel groups in even columns being second view pixel groups used for a second view to be displayed;

the grating array shielding along the column direction a part of the first view pixel groups on a first side and a part of the second view pixel groups on a second side, the first sides and the second side being opposite sides;

the display driving methods comprising:

segmenting the first view and the second view into a plurality of theoretical pixel elements respectively and determining color components for colors in each theoretical pixel element;

for each view, setting luminance for each subpixel used for the view based on color components for color of the subpixel in theoretical pixel elements that are covered by a second preset sampling region corresponding to the subpixel and belong to the view.

Optionally, length of a side of the subpixel in the column direction is a, and length of the subpixel in a row direction is b, the second preset sampling region is a rectangular sampling region;

wherein four middle points of four sides of the rectangular sampling region for the subpixel are arranged such that two middle points are in the same column direction as center of the subpixel and at a distance of $$\frac{3}{2}a$$

from the center of the subpixel respectively, and the other two middle points are in the same row direction as the center of the subpixel and at a distance of b from the center of the subpixel respectively.

Optionally, the step of, for each view, setting luminance for each subpixel used for the view based on color components for color of the subpixel in theoretical pixel elements that are covered by a preset sampling region corresponding to the subpixel and belong to the view comprises:

for each subpixel used for a view, determining overlapping areas between its corresponding preset sampling region and each theoretical pixel element covered by the rectangular preset sampling region and belonging to the view and color components for the color of the subpixel in said each theoretical pixel element; calculating products of overlapping areas corresponding to said each theoretical pixel element and the respective determined color components; and setting the luminance of the subpixel based on a sum of the products and an area of the preset sampling region.

To this end, the present disclosure further provides a display driving device for driving a 3D display device comprising a grating array and a pixel array described above, the subpixel groups in odd columns being first view pixel groups used for a first view to be displayed; the subpixel groups in even columns are second view pixel groups used for a second view to be displayed;

the grating array being configured to shield along the column direction a part of the first view pixel groups on a first side and a part of the second view pixel groups on a second side, the first sides and the second side being opposite sides;

the display driving device comprising:

a second view pixel segmenting unit being configured to segment the first view and the second view into a plurality of theoretical pixel elements respectively and determine color components for colors in each theoretical pixel element;

a second luminance setting unit being configured to, for each view, set luminance for each subpixel used for the view based on color components for color of the subpixel in theoretical pixel elements that are covered by a second preset sampling region corresponding to the subpixel and belong to the view.

Optionally, length of a side of the subpixel in the column direction is a, and length of the subpixel in a row direction is b, the second preset sampling region is a rectangular sampling region;

wherein four middle points of four sides of the rectangular sampling region for the subpixel are arranged such that two middle points are in the same column direction as center of the subpixel and at a distance of $$\frac{3}{2}a$$

from the center of the subpixel respectively, and the other two middle points are in the same row direction as the center of the subpixel and at a distance of b from the center of the subpixel respectively.

To this end, the present disclosure further provides a display device comprising a pixel array described above.

Optionally, the display device further comprises a display driving device described above.

Embodiments of the present disclosure provide the following beneficial effects, i.e. a pixel array according to embodiments of the present disclosure is suitable for application of Pentile technologies under 2D/3D display mode. Therefore, the visual resolution of the display device may be effectively improved.

DETAILED DESCRIPTION OF THE INVENTION

A pixel array, a display driving method, a display driving device and a display device provided by the present disclosure will be described in detail with the reference to drawings in order to help those ordinarily skilled in the art to better understand solutions of the present disclosure.

Figure 1:
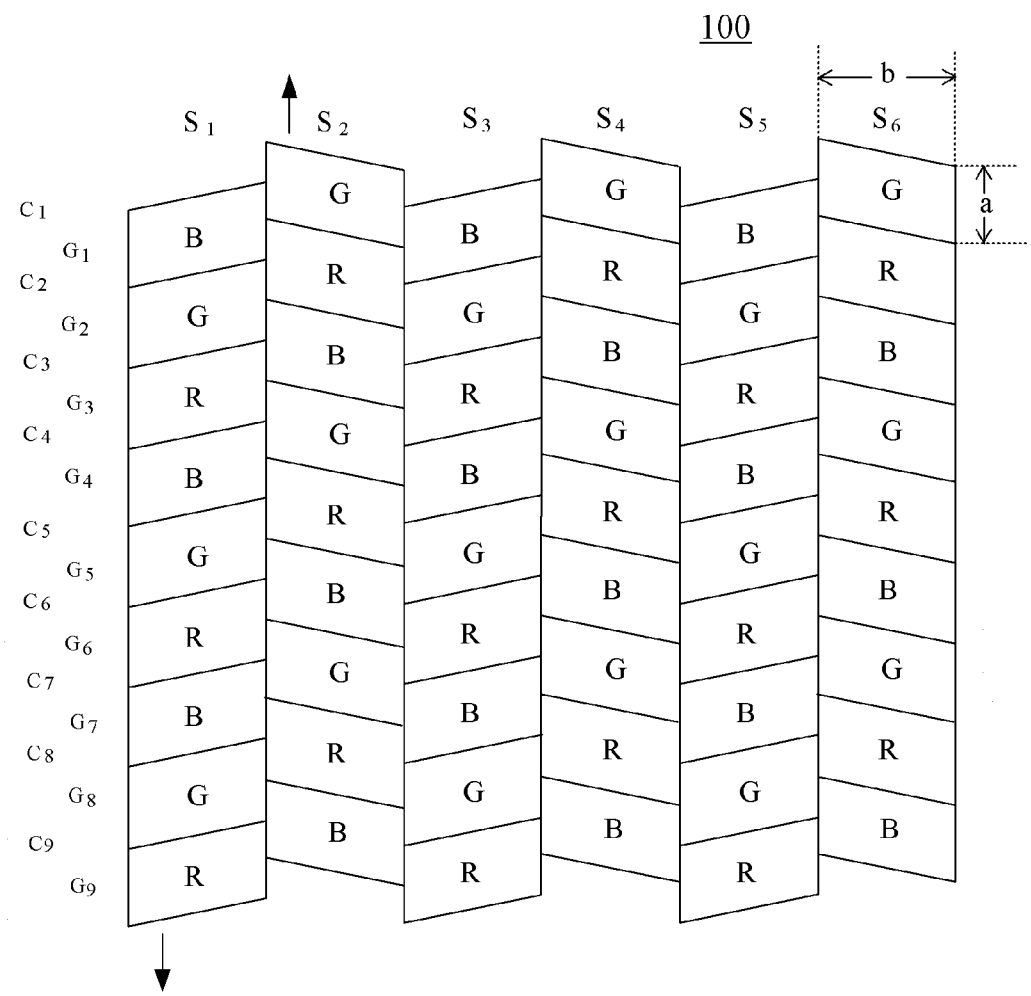
FIG. 1 is a top view illustrating a pixel array in accordance with an embodiment of the present disclosure.

FIG. 1 is a top view illustrating a pixel array 100 in accordance with an embodiment of the present disclosure. The pixel array 100 comprises a plurality of columns of subpixel groups $S_1$, $S_2$, $S_3$, $S_4$, $S_5$, $S_6$, and each column of subpixel group comprises M×N subpixels: $C_1$-$C_9$; $G_1$-$G_9$, wherein N is the number of colors (e.g. R, G, B) of the subpixels, and M is an integer equal or greater than 3. A direction in which subpixels in the subpixel groups in odd columns, e.g. $S_1$, $S_3$, $S_5$, are twisted (i.e. a twisted direction) is opposite to a direction in which subpixels in the subpixel groups in even columns, e.g. $S_2$, $S_4$, $S_6$, are twisted.

A twisted direction of a subpixel may be a tilt direction of the subpixel in a column direction. The twisted directions of two subpixels are opposite in the column direction may refer to an arrangement where same sides of the subpixels tilt relative to the column direction on opposite directions. As shown in FIG. 1, subpixels in subpixel group $S_1$, $S_3$, $S_5$ in odd column are twisted downwards relative to the column direction, that is, the left sides of these subpixels are tilted downwards (shown by a downwards arrow in FIG. 1). In contrast, subpixels in subpixel groups $S_2$, $S_4$, $S_6$ in even columns are twisted upwards relative to the column direction, that is, the left sides of these subpixels are tilted upwards (shown by the upwards arrow in FIG. 1).

It would be appreciated that the twisted direction of subpixels in subpixel groups $S_1$, $S_3$, $S_5$ in odd columns and the twisted direction of subpixels in the subpixel groups $S_2$, $S_4$, $S_6$ in even columns are exchangeable.

Sub-pixels in a pixel array according to an embodiment of the present disclosure may be deformed into a parallelogram by twisting, which is different from conventional shapes of subpixels (e.g., rectangle). In accordance with an embodiment of the present disclosure, each subpixel in a pixel array has a shape of parallelogram, optionally, a shape of non-right angled parallelogram. Optionally, for subpixels in each subpixel group, sides in a column direction are aligned with respect to the column direction, while sides in a row direction tilt relative to the row direction. For each subpixel (e.g., the green subpixel G at row C1, column S6), length of a side in a column direction is a, and length of the subpixel in a row direction is b.

Optionally, acute angles of the parallelogram are in a range of 70 degree to 90 degree. Optionally, acute angles of the parallelogram are in a range of 82 degree to 85 degree.

Optionally, a length ratio of a side of a subpixel that is in a column direction to a side of the subpixel that is not in the column direction is $$\left[\frac{1}{2}, 1\right].$$

In the embodiment, preferably, the subpixel groups in odd columns and the subpixel groups in even columns (e.g., the subpixel group $S_1$ and the subpixel group $S_2$, or the subpixel group $S_2$ and the subpixel group $S_3$) are staggered in the column direction. As shown in FIG. 1, instead of being aligned, sides of subpixels in subpixel groups in odd columns and subpixels in subpixel groups in even columns (such as the blue subpixel B at row G1, column S1 and the green subpixel G at row C1, column S2) are staggered with each other in the column direction. Preferably, subpixel groups in odd columns and subpixel groups in even columns are staggered by $$\frac{1}{2}a$$

in the column direction. In this way, subpixels of same colors in the pixel array may be distributed uniformly so as to ensure that the display panel may emit light uniformly.

It should be noted that the above situation where shape of each subpixel is parallelogram and subpixel groups in odd columns and subpixel groups in even columns are staggered by $$\frac{1}{2}a$$

in the column direction is merely an exemplary implementation of the present embodiment, and solutions of the present disclosure are not limited thereto.

In an example, the value of N is assumed to be 3, and the pixel array is assumed to be a triangular pixel array. A triangular (Delta, written as "Δ") pixel array may refer to an array in which a shape formed by centers of three arbitrarily closest subpixels of different colors is a triangle.

It should be noted that although the pixel array shown in FIG. 1 comprises subpixels arranged in 6 columns (S1-S6), 9 rows (G1-G9 or C1-C9), this pixel array is only an example, and solutions of the present disclosure are not limited thereto.

A pixel array according to embodiments of the present disclosure is not only suitable to application of Pentile technologies in 2D display mode, but also suitable to application of Pentile technologies in 3D display mode. Particular solutions will be described in more detail below.

Figure 2:
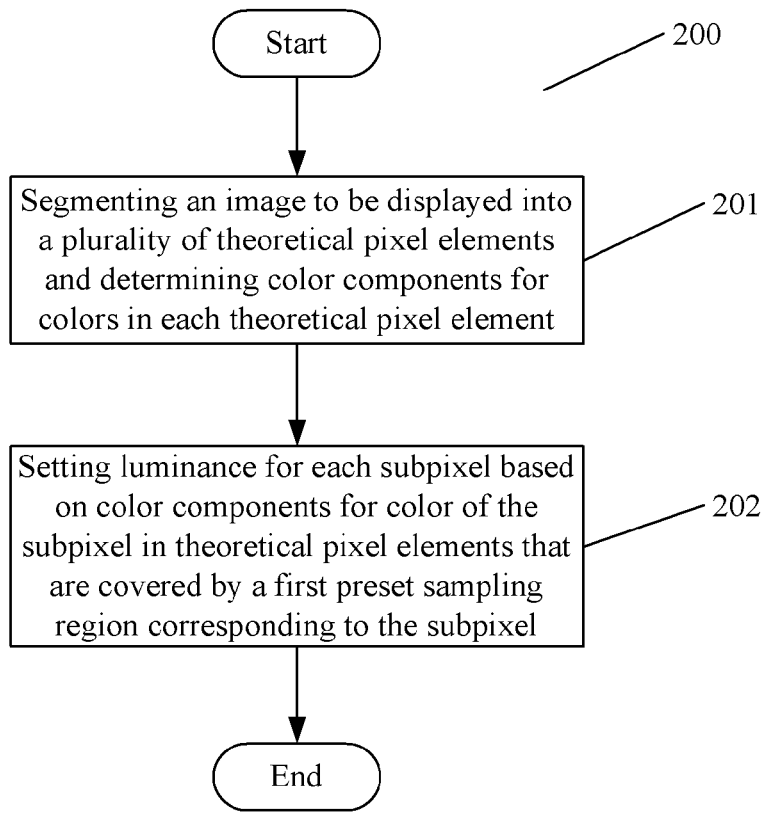
FIG. 2 is a flow chart illustrating a first exemplary display driving method in accordance with an embodiment of the present disclosure.

FIG. 2 is a flow chart illustrating a first exemplary display driving method 200 in accordance with an embodiment of the present disclosure. The display driving method 200 may be used to drive a 2D display device which comprises a pixel array according to embodiments of the present disclosure. The display driving method will be described with the reference to FIG. 3 to FIG. 10.

In accordance with an embodiment of the present disclosure, the 2D display device comprises a pixel array 100 as shown in FIG. 1. The pixel array 100 comprises subpixels of three different colors, e.g. red subpixel R, green subpixel G and blue subpixel B. For each subpixel, length of a side in a column direction is a, and length in a row direction is b.

The display driving method 200 according to the embodiment of the present disclosure comprises:

Step 201: segmenting an image to be displayed into a plurality of theoretical pixel elements and determining color components for colors in each theoretical pixel element.

The image to be displayed may be segmented into a plurality of pixel elements, i.e., theoretical pixel elements, based on a pixel resolution that the display device may achieve theoretically. Each theoretical pixel element may correspond to a predetermined number of subpixels and color components for colors in each theoretical pixel element may be determined based on colors of corresponding subpixels.

The area corresponding to a theoretical pixel element is referred to as unit pixel element area. In accordance with an embodiment of the present disclosure, there are a predetermined number of subpixels contained within the unit pixel element area. The predetermined number may be set to be smaller than the number of colors of subpixels comprised in the pixel array. Optionally, the predetermined number may be $$2, \frac{3}{2},$$

or 1.

Figure 3A:
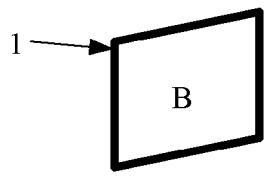
FIGS. 3a to 3c are schematic views illustrating three different correspondences between theoretical pixel elements and subpixels according to embodiments of the present disclosure.
Figure 3B:
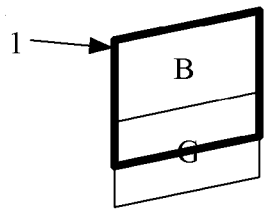
Figure 3C:
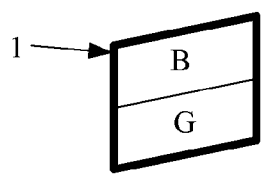

FIGS. 3a to 3c are schematic views illustrating three different correspondences between a theoretical pixel element and a subpixel in accordance with embodiments of the present disclosure. As shown in FIGS. 3a to 3c, it is assumed that the size of an area corresponding to a theoretical pixel element 1 is fixed, and the size of a subpixel in a pixel array may vary (e.g., this may be achieved by controlling sizes of subpixels R/G/B when preparing the pixel array). For the sake of simplicity, it is assumed that the theoretical pixel element 1 may correspond to a parallelogram region, wherein length of one side of the parallelogram region may correspond to length of a side of a subpixel that is not in the column direction.

For example, as shown in FIG. 3a, the unit pixel element area of the theoretical pixel element 1 may contain one subpixel, i.e., one theoretical pixel element 1 corresponds to one subpixel, such as blue subpixel B. As shown in FIG. 3b, the unit pixel element area may contain $$\frac{3}{2}$$

subpixels, i.e., one theoretical pixel element 1 corresponds to an area of one subpixel (such as blue subpixel B) and a half area of another subpixel (such as green subpixel G) adjacent to the subpixel in the column direction. As shown in FIG. 3c, the unit pixel element area may contain 2 subpixels (such as blue subpixel B and green subpixel G), i.e., one theoretical pixel element 1 corresponds to two subpixels adjacent in the column direction.

It should be noted that the following explanation will take one theoretical pixel element 1 corresponding to $$\frac{3}{2}$$

subpixels adjacent in the column direction as an example. However, those ordinarily skilled in the art would appreciate that this is only an example, and solutions of the present disclosure are not limited thereto.

Figure 4:
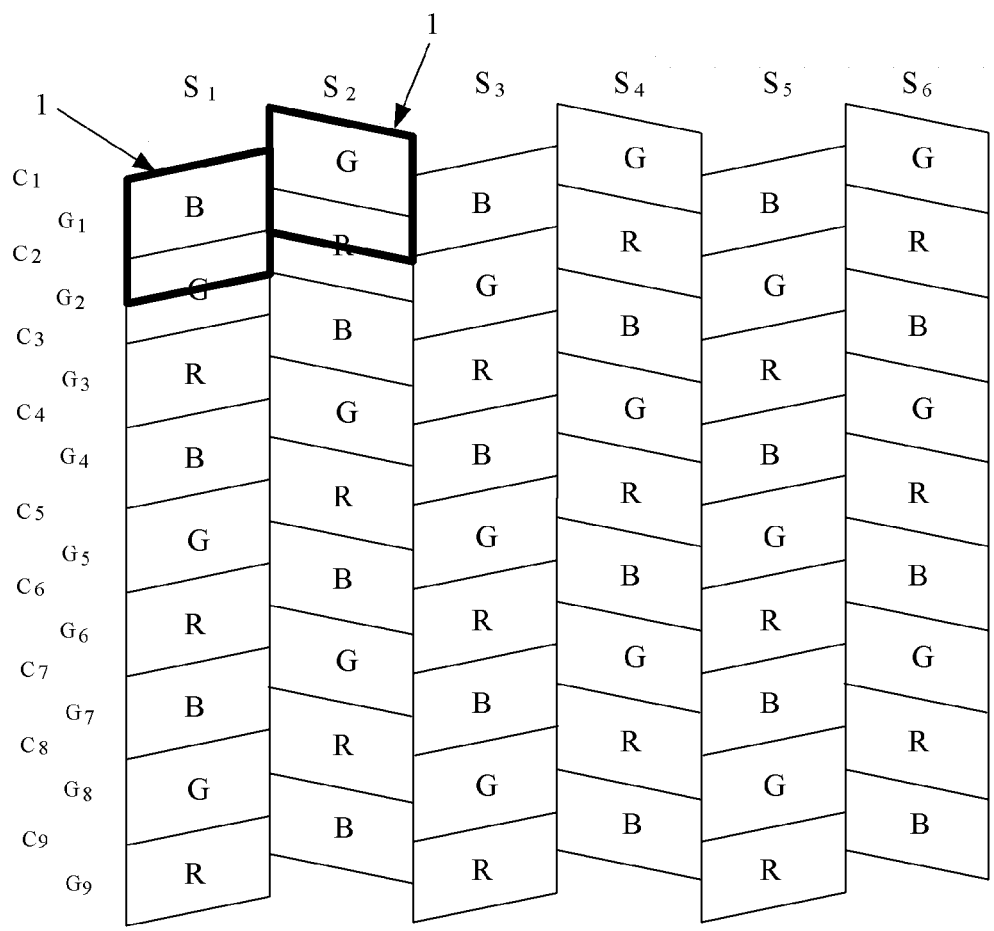
FIG. 4 is a schematic view illustrating one theoretical pixel element corresponding to one and a half subpixels in a pixel array as shown in FIG. 1 in accordance with an embodiment of the present disclosure.

FIG. 4 is a schematic view illustrating one theoretical pixel element corresponding to one and a half subpixels in a pixel array as shown in FIG. 1 in accordance with an embodiment of the present disclosure. As shown in FIG. 4, according to a rule that one theoretical pixel element 1 corresponds to one and a half subpixels, an image to be displayed may be segmented into a plurality of theoretical pixel elements 1 (in FIG. 4, only one theoretical pixel element in column S1 and one theoretical pixel element in column S2 are depicted by way of example).

After segmentation of the theoretical pixel elements, red color component, green color component and blue color component in each theoretical pixel element 1 may be determined based on subpixels (such as red subpixel R, green subpixel G and blue subpixel B) contained in the unit pixel element area. The determination of color components for colors in a theoretical pixel element 1 may be carried out using any suitable technical measure in the art.

After step 201, the display driving method 200 further comprises:

Step 202: setting luminance for each subpixel based on color components for color of the subpixel in theoretical pixel elements that are covered by a first preset sampling region corresponding to the subpixel.

In accordance with an embodiment of the present disclosure, a preset sampling region may be set for each subpixel. The preset sampling region may define for a subpixel a range of relevant (e.g., adjacent) subpixels whose colors will be borrowed by the subpixel during image displaying, and therefore the preset sampling region may be a region that contains not only this subpixel but also relevant subpixel(s) (either partially or entirely). Accordingly, the preset sampling region may either partially or entirely cover theoretical pixel element(s) corresponding to the subpixel and its relevant subpixel(s).

For the sake of simplicity, the present disclosure will be described with reference to the pixel array 100 in FIG. 1, taking subpixel groups in odd columns and subpixel groups in even columns being staggered by $$\frac{1}{2}a$$

in the column direction as an example.

In accordance with an embodiment of the present disclosure, a first preset sampling region corresponding to each subpixel is set as a rhombic sampling region. Optionally, four vertexes of the rhombic sampling region for a subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively.

Sampling regions corresponding to subpixels in accordance with embodiments of the present disclosure during 2D displaying will be described with reference to FIG. 5 to FIG. 10.

Figure 5:
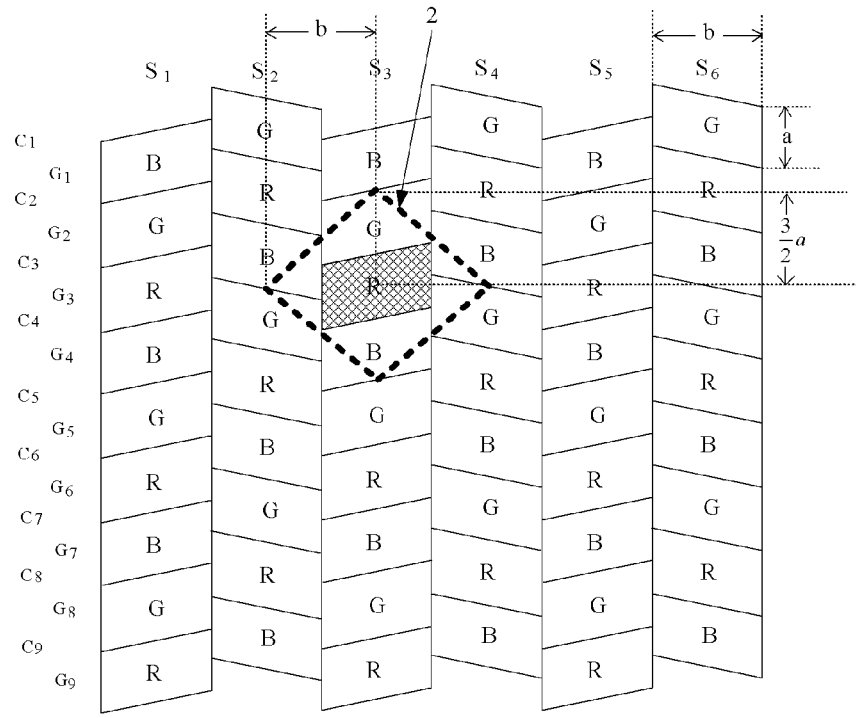
FIG. 5 is a schematic view illustrating a sampling region for a red subpixel at row G3, column S3 during 2D displaying in accordance with an embodiment of the present disclosure.
Figure 6:
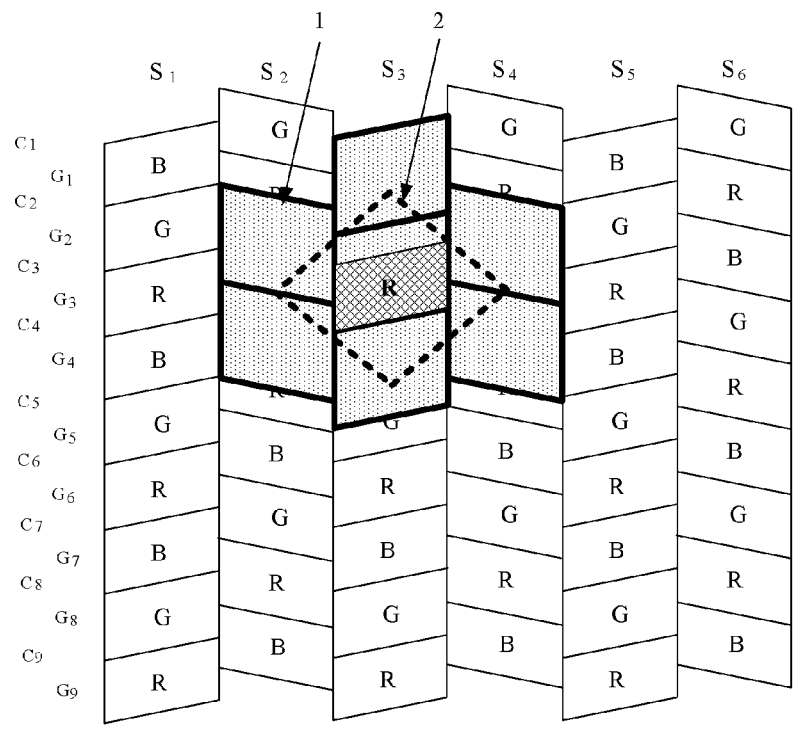
FIG. 6 is a schematic view illustrating theoretical pixel elements covered by the sampling region for the red subpixel as shown in FIG. 5 according to an embodiment of the present intention.

FIG. 5 is a schematic view illustrating a sampling region 2 of a red subpixel R at row G3, column S3 during 2D displaying. FIG. 6 is a schematic view illustrating theoretical pixel elements 1 covered by the sampling region 2 for the red subpixel R as shown in FIG. 5.

As shown in FIG. 5 and FIG. 6, during 2D displaying, four vertexes of a rhombic sampling region 2 corresponding to a red subpixel R at row G3, column S3 are arranged such that two vertexes are in the same column direction as center of the red subpixel and at a distance of $$\frac{3}{2}a$$

from the center of the red subpixel respectively (i.e., being positioned at middle points of respective lower sides of two blue subpixels at row G1, column S3 and row G4, column S3 respectively); and the other two vertexes are in the same row direction as the center of the red subpixel and at a distance of b from the center of the red subpixel respectively (i.e., being positioned at middle points of respective lower sides of two blue subpixels at row C3, column S2 and row C3, column S4 respectively). As shown in FIG. 6, the rhombic sampling region 2 of the red subpixel covers at least partial areas of seven different theoretical pixel elements 1.

Figure 7:
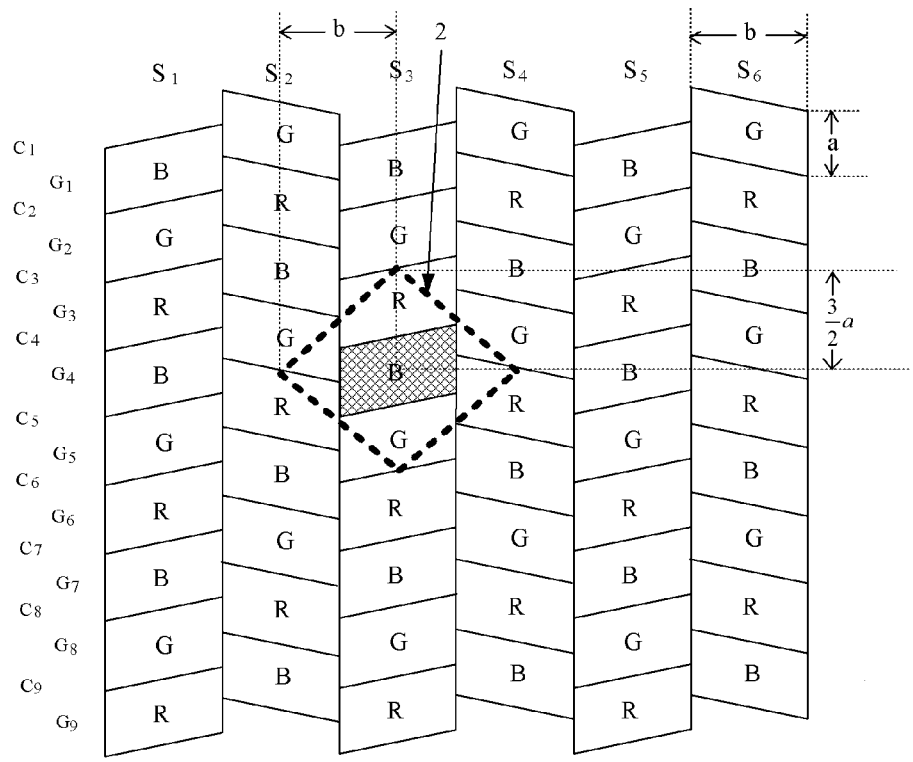
FIG. 7 is a schematic view illustrating a sampling region for a blue subpixel at row G4, column S3 during 2D displaying in accordance with an embodiment of the present disclosure.
Figure 8:
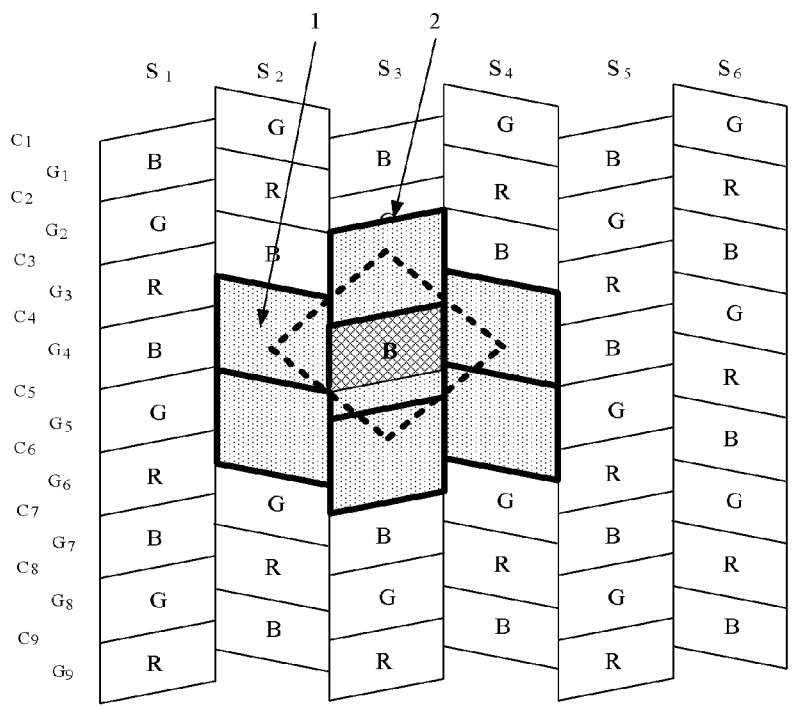
FIG. 8 is a schematic view illustrating theoretical pixel elements covered by the sampling region for the blue subpixel as shown in FIG. 7 according to an embodiment of the present intention.

FIG. 7 is a schematic view illustrating a sampling region for a blue subpixel B at row G4, column S3 during 2D displaying. FIG. 8 is a schematic view illustrating theoretical pixel elements covered by the sampling region for the blue subpixel shown in FIG. 7.

As shown in FIG. 7 and FIG. 8, during 2D displaying, four vertexes of a rhombic sampling region 2 corresponding to a blue subpixel B at row G4, column S3 are arranged such that two vertexes are in the same column direction as the center of the blue subpixel and at a distance of $$\frac{3}{2}a$$

from the center of the blue subpixel respectively (i.e., being positioned at middle points of respective lower side of two green subpixels at row G2, column S3 and row G5, column S3 respectively); the other two vertexes are in the same row direction as the center of the blue subpixel and at a distance of b from the center of the blue subpixel respectively (i.e., being positioned at middle points of respective lower side of two green subpixels at row C4, column S2 and row C4, column S4 respectively). As shown in FIG. 8, the rhombic sampling region 2 of the blue subpixel covers at least partial areas of 7 different theoretical pixel elements 1.

Figure 9:
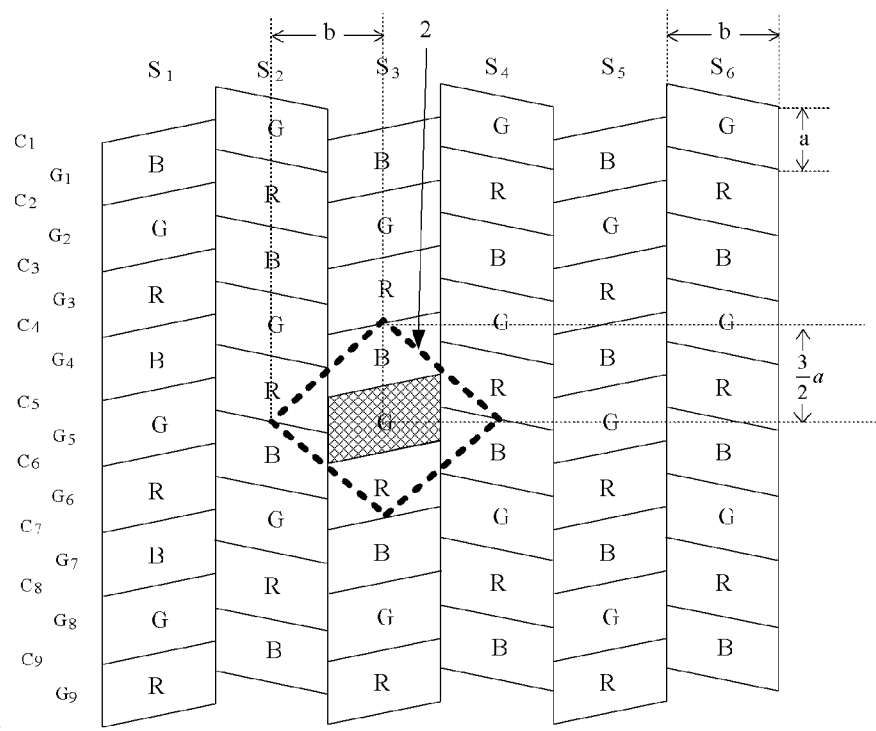
FIG. 9 is a schematic view illustrating a sampling region for a green subpixel at row G5, column S3 during 2D displaying in accordance with an embodiment of the present disclosure.
Figure 10:
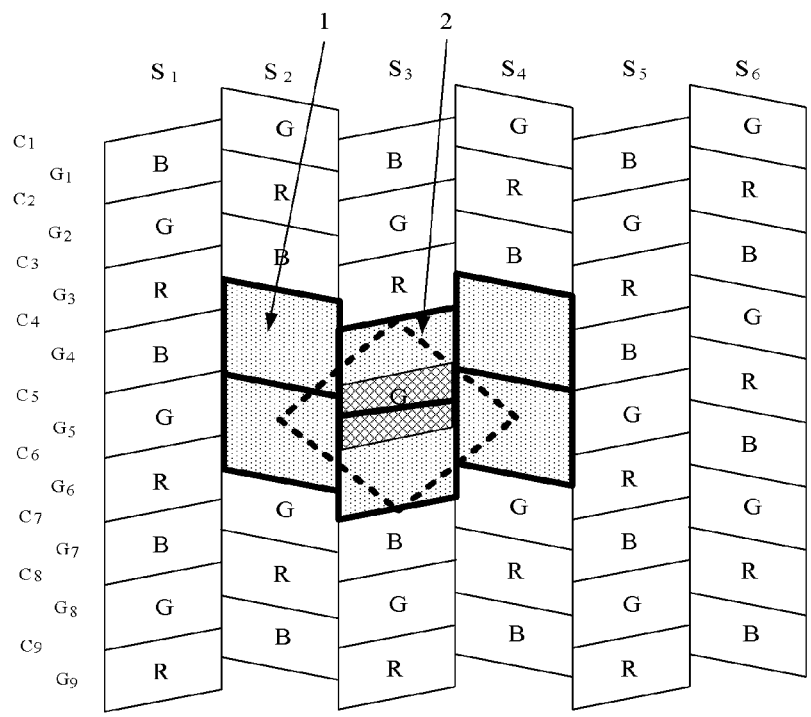
FIG. 10 is a schematic view illustrating theoretical pixel elements covered by the sampling region for the green subpixel shown in FIG. 9 according to an embodiment of the present intention.

FIG. 9 is a schematic view illustrating a sampling region 2 for a green subpixel G at row G5, column S3 during 2D displaying. FIG. 10 is a schematic view illustrating theoretical pixel elements covered by the sampling region for the green subpixel shown in FIG. 9.

As shown in FIG. 9 and FIG. 10, during 2D displaying, four vertexes of a rhombic sampling region 2 corresponding to a green subpixel G at row G5, column S3 are arranged such that two vertexes are in the same column direction as the center of the green subpixel and at a distance of $$\frac{3}{2}a$$

from the center of the green subpixel respectively (i.e., being positioned at middle points of respective lower side of two red subpixels at row G3, column S3 and row G6, column S3 respectively); the other two vertexes are in the same row direction as the center of the green subpixel and at a distance of b from the center of the green subpixel respectively (i.e., being positioned at middle points of respective lower side of two red subpixels at row C5, column S2 and row C5, column S4 respectively). As shown in FIG. 10, the rhombic sampling region 2 of the green subpixel covers at least partial areas of 6 different theoretical pixel elements 1.

A rhombic sampling region may be set in this way so that the whole display area can be completely sampled, while sampling will not be overlapped, thereby avoiding a problem of picture distortion due to incomplete sampling or overlapping sampling.

In accordance with an embodiment of the present disclosure, optionally, luminance of a subpixel may be determined by: for each subpixel, determining overlapping areas between a preset sampling region corresponding to the subpixel and each theoretical pixel element covered by the preset sampling region and color components for the color of the subpixel in each theoretical pixel element; calculating products of overlapping areas corresponding to said each theoretical pixel element and respective determined color components; and setting the luminance of the subpixel based on a sum of the products and an area of the preset sampling region.

According to an optional embodiment, after sampling by using the preset sampling region, luminance of corresponding subpixel may be set in any other suitable way.

Figure 11:
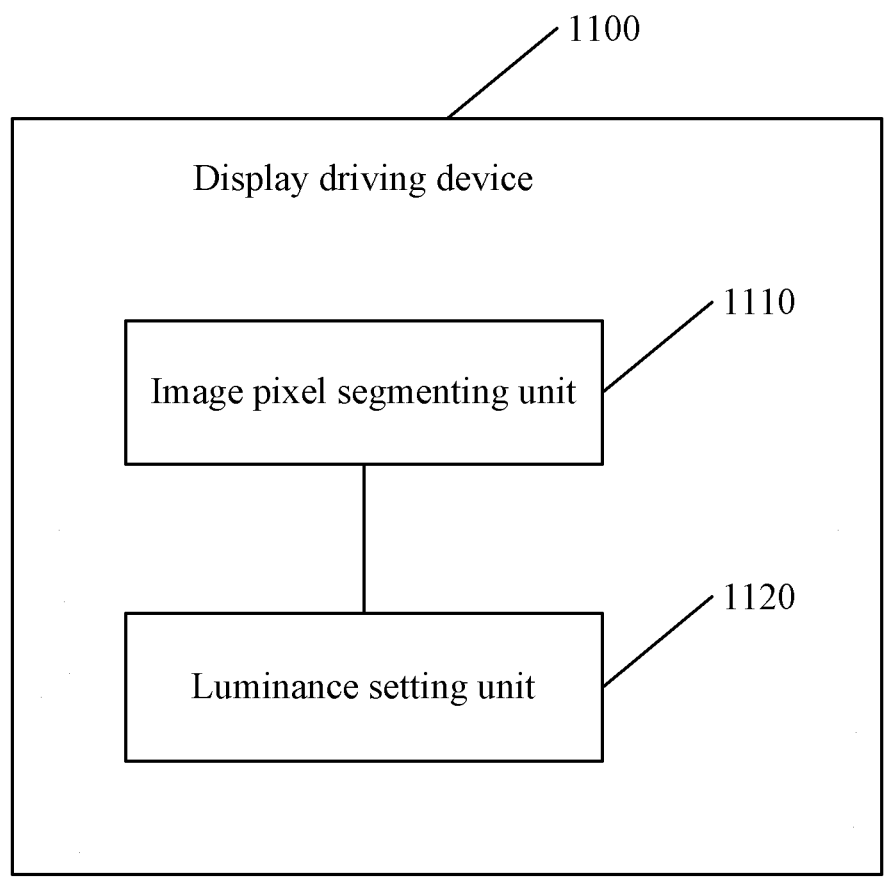
FIG. 11 is a schematic view illustrating a first exemplary display driving device in accordance with an embodiment of the present disclosure.

FIG. 11 is a schematic view illustrating a first exemplary display driving device 1100 in accordance with an embodiment of the present disclosure. The display driving device 1100 may be used to drive 2D display device. The 2D display device comprises a pixel array in accordance with an embodiment of the present disclosure, such as the pixel array 100 shown in FIG. 1.

The display driving device 1100 comprises a first image pixel segmenting unit 1110 and a first luminance setting unit 1120. The first image pixel segmenting unit 1110 is configured to segment an image to be displayed into a plurality of theoretical pixel elements and determine the color component for colors in each theoretical pixel element. The first luminance setting unit 1120 is configured to set luminance for each subpixel based on color components for color of the subpixel in theoretical pixel elements that are covered by a first preset sampling region corresponding to the subpixel.

Optionally, the first preset sampling region is a rhombic sampling region. When subpixel groups in odd columns and subpixel groups in even column are staggered by $$\frac{1}{2}a$$

in the column direction, four vertexes of the rhombic sampling region for the subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively, wherein a is length of a side of a subpixel in the column direction and b is length of the subpixel in the row direction.

It should be noted that the image pixel segmenting unit 1110 may be configured to perform action(s) in step 101 described with reference to FIG. 2 to FIG. 10, and the first luminance setting unit 1120 may be configured to perform action(s) in step 102 described with reference to FIG. 2 to FIG. 10. For the purpose of conciseness, detailed descriptions thereof are omitted.

Figure 12:
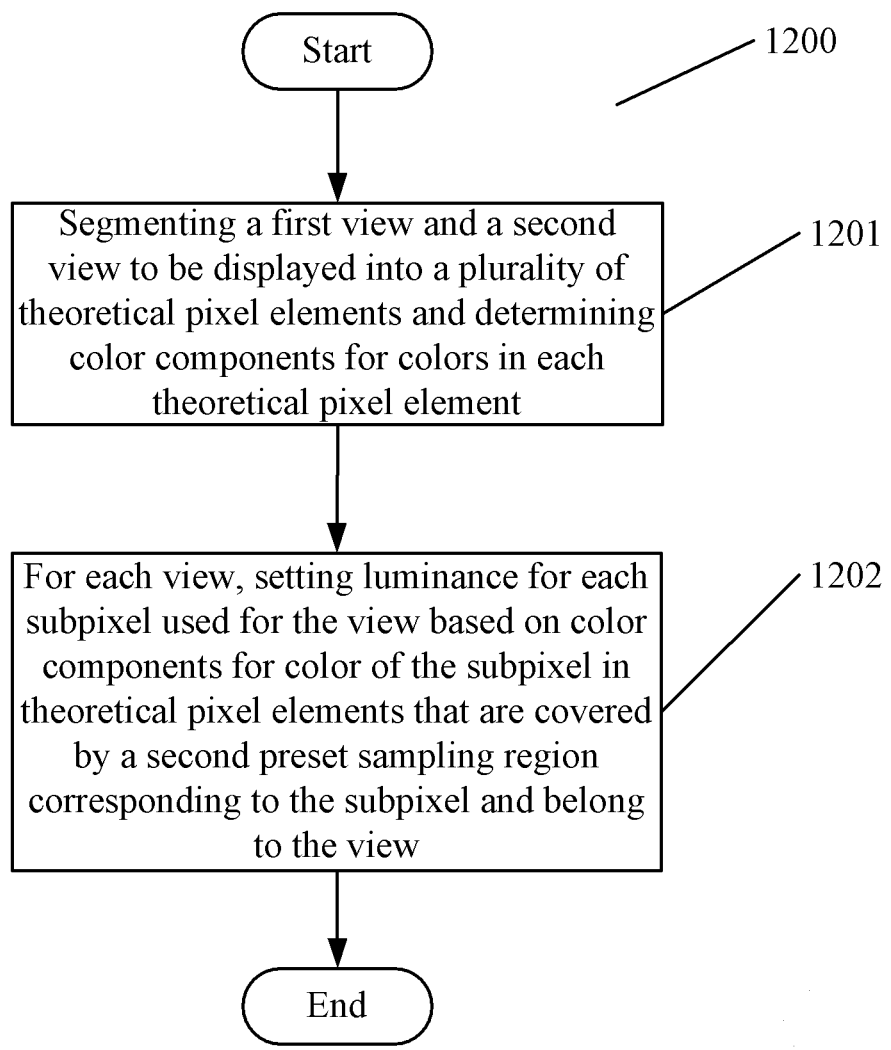
FIG. 12 is a flow chart illustrating a second exemplary display driving method in accordance with an embodiment of the present disclosure.

FIG. 12 is a flow chart illustrating a second exemplary display driving method 1200 in accordance with an embodiment of the present disclosure. The display driving method is used to drive a 3D display device comprising a pixel array according to embodiments of the present disclosure. The display driving method will be described with reference to FIG. 13 to FIG. 19.

Figure 13:
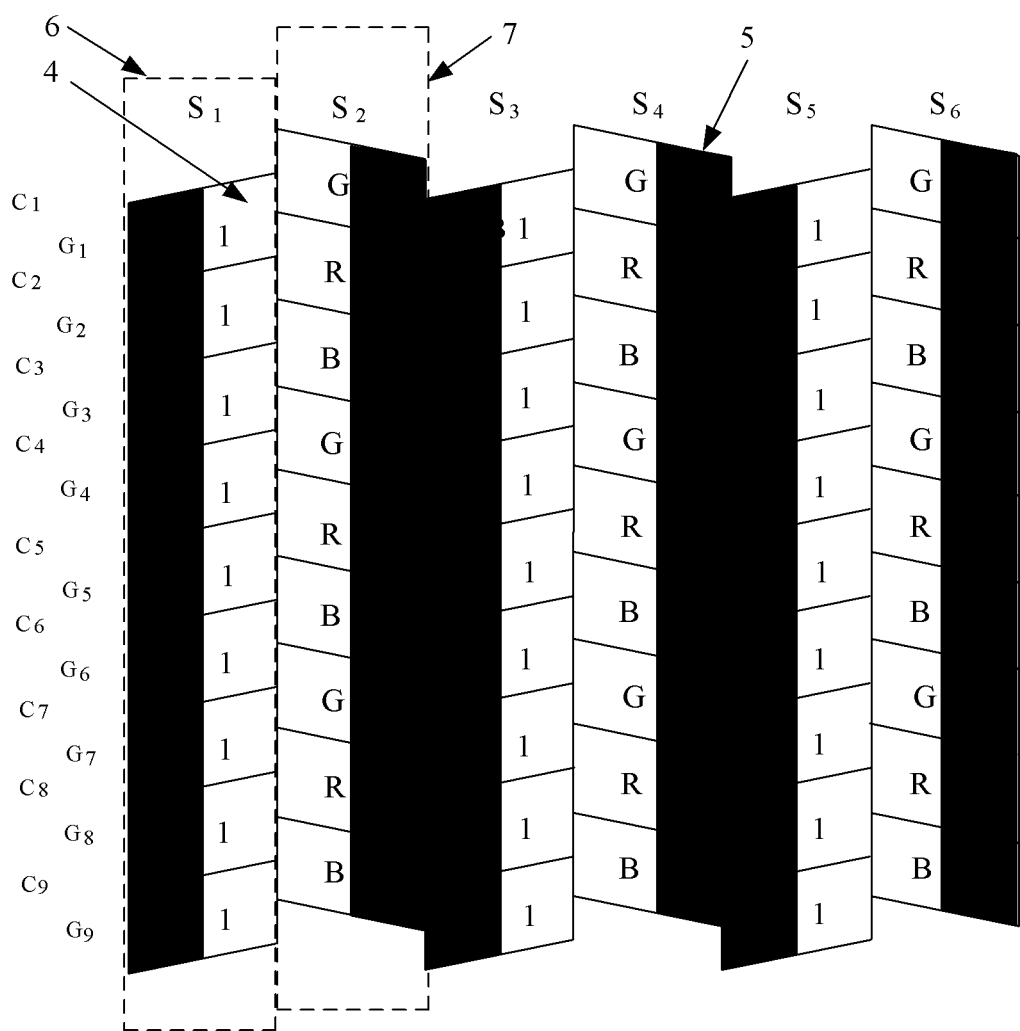
FIG. 13 is a structural schematic view illustrating a pixel array in accordance with an embodiment of the present disclosure being comprised in a 3D display device.

FIG. 13 is a structural schematic view illustrating a pixel array in accordance with an embodiment of the present disclosure being comprised in a 3D display device. As shown in FIG. 13, the 3D display device comprises a grating array 5 and a pixel array 4 in accordance with an embodiment of the present disclosure. The pixel array 4 may be the pixel array 100 shown in FIG. 1. The subpixel groups in odd columns are first view pixel groups 6 (comprising a plurality of R1s, G1s and B1s); the subpixel groups in even columns are second view pixel groups 7 (comprising a plurality of R2s, G2s, and B2s). The grating array 4 shields along a column direction a part of the first view pixel groups 6 on a first side and a part of the second view pixel groups 7 on a second side, and the first side and the second side are opposite sides. The first view pixel groups 6 are used to display a first view, and the second view pixel groups 7 are used to display a second view. The first view and the second view enter a viewer's left eye and right eye respectively so that the viewer may obtain 3D perception.

In accordance with an embodiment of the present disclosure, the pixel array 4 may comprise subpixels of three different colors, e.g. red subpixel R, green subpixel G and blue subpixel B. Length of a side of each subpixel in a column direction is a and length of each subpixel in a row direction is b.

The display driving method 1200 according to the embodiment of the present disclosure comprises:

Step 1201: segmenting the first view and the second view into a plurality of theoretical pixel elements respectively and determining color components for colors in each theoretical pixel element.

Optionally, in step 1201, the first view may be segmented into a plurality of theoretical pixel elements according to the number of pixels that may be achieved by the 3D display device theoretically. Thereafter, red component, green component and blue component in each theoretical pixel element may be determined. Segmentation of a plurality of theoretical pixel elements corresponding to the second view and determination of red component, green component and blue component in each theoretical pixel element may be carried out in a same way.

In this embodiment, it is still assumed that one theoretical pixel element corresponds to an area of one subpixel and a half area of another subpixel adjacent to the subpixel in the column direction.

Step 1202, for each view, setting luminance for each subpixel used for the view based on color components for color of the subpixel in theoretical pixel elements that are covered by a second preset sampling region corresponding to the subpixel and belong to the view.

In accordance with an embodiment of the present disclosure, a second preset sampling region corresponding to each subpixel is set as a rectangular sampling region. Optionally, four middle points of four sides of the rectangular sampling region for the subpixel are arranged such that two middle points are in the same column direction as center of the subpixel and at a distance of $$\frac{3}{2}a$$

from the center of the subpixel respectively, and the other two middle points are in the same row direction as the center of the subpixel and at a distance of b from the center of the subpixel respectively.

Sampling regions corresponding to subpixels in embodiments of the present disclosure during 3D displaying will described with reference to FIG. 14 to FIG. 19. In these drawings, subpixels R1, B1 and G1 represent subpixels used for the first view and subpixels R2, B2 and G2 represent subpixels used for the second view.

Figure 14:
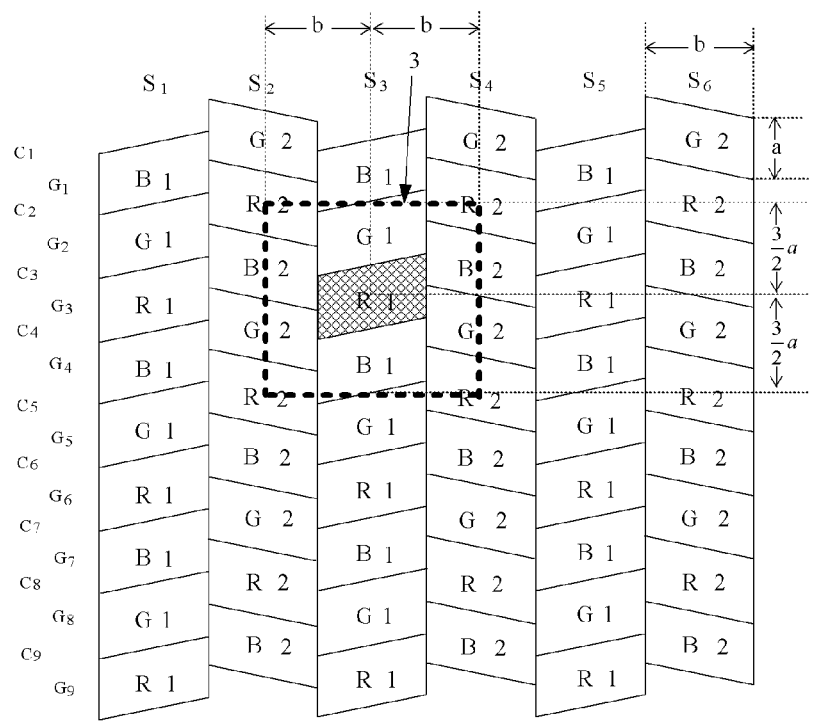
FIG. 14 is a schematic view illustrating a sampling region for a red subpixel at row G3, column S3 during 3D displaying in accordance with an embodiment of the present disclosure.
Figure 15:
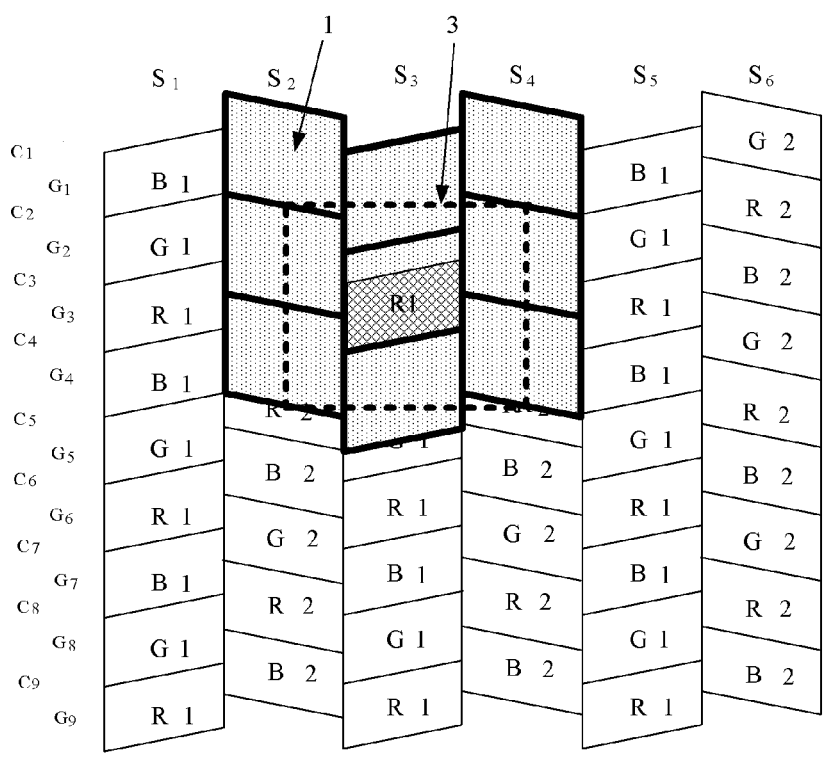
FIG. 15 is a schematic view illustrating theoretical pixel elements covered by the sampling region for the red subpixel as shown in FIG. 14 according to an embodiment of the present intention.

FIG. 14 is a schematic view illustrating a sampling region 3 for a red subpixel R1 at row G3, column S3 during 3D displaying. FIG. 15 is a schematic view illustrating theoretical pixel elements 1 covered by the sampling region 3 for the red subpixel R1 as shown in FIG. 14.

As shown in FIG. 14 and FIG. 15, during 3D displaying, four middle points of four sides of the rectangular sampling region 3 corresponding to the red subpixel R1 at row G3, column S3 are arranged such that two middle points are in the same column direction as the center of the red subpixel and at a distance of $$\frac{3}{2}a$$

from the center of the red subpixel respectively (i.e., being positioned at middle points of respective lower sides of two blue subpixels B2s at row G1, column S3 and row G4, column S3 respectively); the other two middle points are in the same row direction as the center of the red subpixel and at a distance of b from the center of the red subpixel respectively (i.e., being positioned at middle points of respective lower side of two blue subpixels B1s at row C3, column S2 and row C3, column S4 respectively). Accordingly, four vertexes of the rectangular sampling region 3 of the red subpixel are respectively arranged such that the four vertexes are centers of respective red subpixels at row C2, column S2, at row C5, column S2, at row C2, column S4, and at row C5, column S4. As shown in FIG. 15, the rectangular sampling region 3 of the red subpixel R1 covers at least partial areas of 9 different theoretical pixel elements 1. In this example, the red subpixel R1 is used for the first view and the theoretical pixel elements belonging to the first view comprises 3 theoretical pixel elements in column S3 where the red subpixel R1 is arranged.

Figure 16:
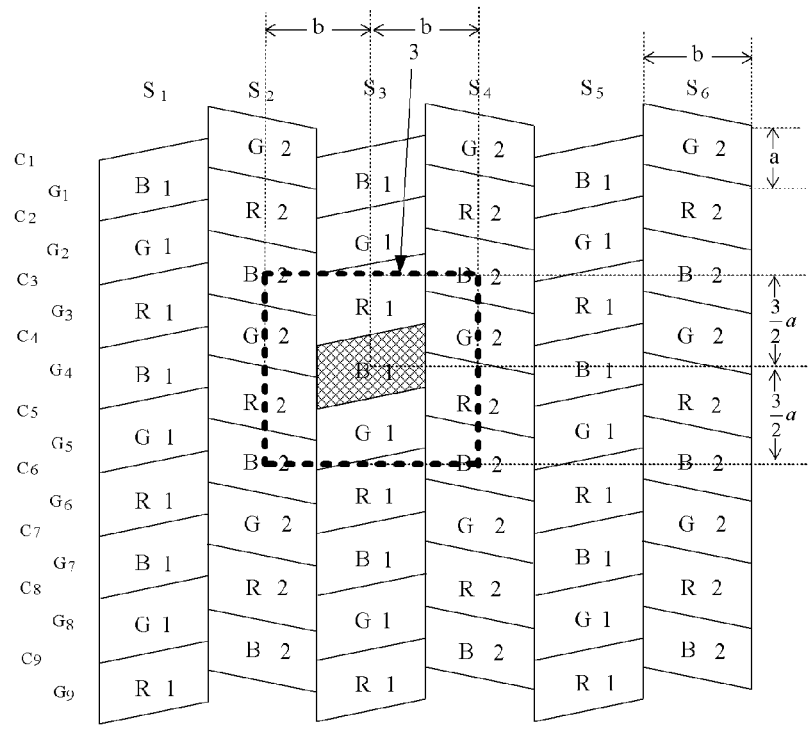
FIG. 16 is a schematic view illustrating a sampling region for a blue subpixel at row G4, column S3 during 3D displaying in accordance with an embodiment of the present disclosure.
Figure 17:
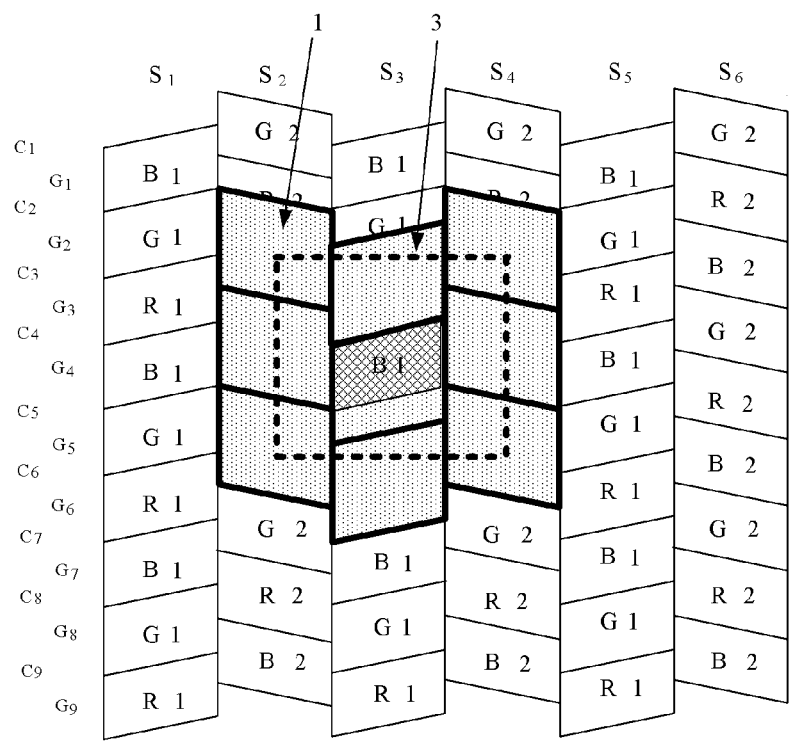
FIG. 17 is a schematic view illustrating a theoretical pixel element covered by the sampling region for the blue subpixel as shown in FIG. 16 according to an embodiment of the present intention.

FIG. 16 is a schematic view illustrating a sampling region 3 for a blue subpixel B1 at row G4, column S3 during 3D displaying. FIG. 17 is a schematic view illustrating theoretical pixel elements 1 covered by the sampling region 3 of the blue subpixel B1 shown in FIG. 13.

As shown in FIG. 16 and FIG. 17, during 3D displaying, four middle points of four sides of the rectangular sampling region 3 corresponding to the blue subpixel B1 at row G4, column S3 are arranged such that two middle points are in the same column direction as the center of the blue subpixel and at a distance of $$\frac{3}{2}a$$

from the center of the blue subpixel respectively (i.e., being positioned at middle points of respective lower side of two green subpixels at row G2, column S3 and at row G5, column S3 respectively); and the other two middle points are in the same row direction as the center of the blue subpixel and at a distance of b from the center of the blue subpixel respectively (i.e., being positioned at middle points of respective lower side of two green subpixels at row C4, column S2 and row C4, column S4 respectively). Accordingly, four vertexes of the rectangular sampling region for the blue subpixel are respectively arranged such that the four vertexes are respective centers of four blue subpixels at row C3, column S2, at row C6, column S2, at row C3, column S4, and at row C6, column S4. As shown in FIG. 17, the rectangular sampling region 3 of the blue subpixel B1 covers at least partial areas of 9 different theoretical pixel elements 1. In this example, the blue subpixel B1 is used for the first view, and therefore the theoretical pixel elements belonging to the first view comprises 3 theoretical pixel elements in column S3 where the blue subpixel B1 is arranged.

Figure 18:
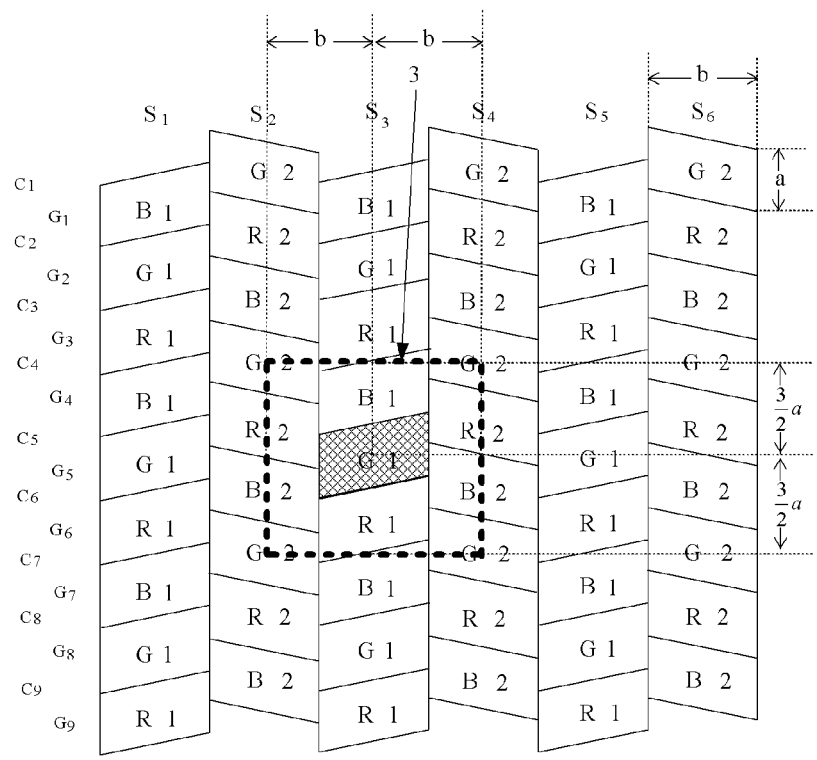
FIG. 18 is a schematic view illustrating a sampling region for a green subpixel at row G5, column S3 during 3D displaying in accordance with an embodiment of the present disclosure.
Figure 19:
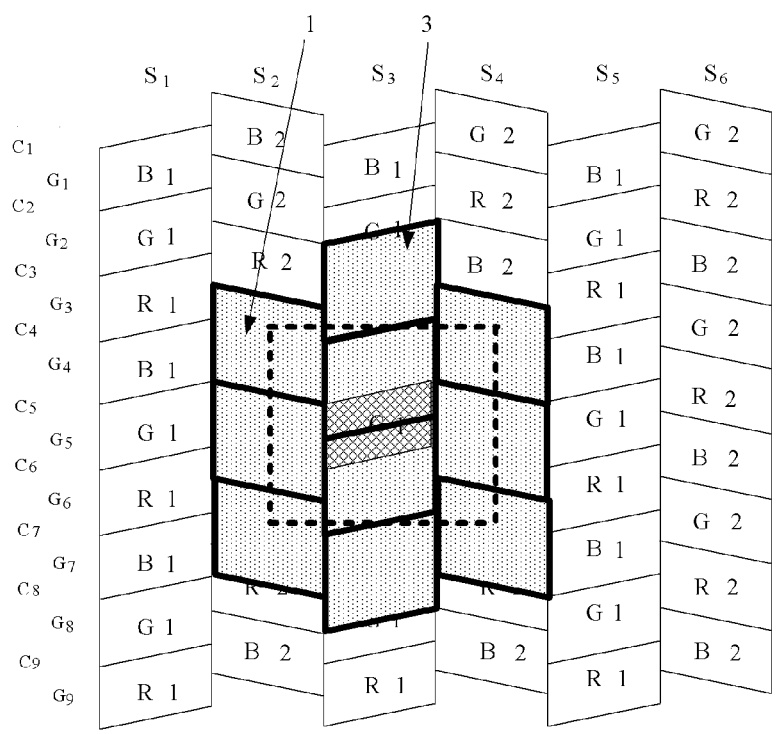
FIG. 19 is a schematic view illustrating a theoretical pixel element covered by the sampling region for the green subpixel as shown in FIG. 18 according to an embodiment of the present intention.

FIG. 18 is a schematic view illustrating a sampling region 3 for a green subpixel G1 at row G5, column S3 during 3D displaying. FIG. 19 is a schematic view illustrating theoretical pixel elements 1 covered by the sampling region 3 of the green subpixel G1 as shown in FIG. 18.

As shown in FIG. 18 and FIG. 19, during 3D displaying, four middle points of four sides of the rectangular sampling region 3 corresponding to the green subpixel at row G5, column S3 are arranged such that two middle points are in the same column direction as the center of the green subpixel and at a distance of $$\frac{3}{2}a$$

from the center of the green subpixel respectively (i.e., being positioned at middle points of respective lower side of two red subpixels at row G3, column S3 and row G6, column S3 respectively); and the other two middle points are in the same row direction as the center of the green subpixel and at a distance of b from the center of the green subpixel respectively (i.e., being positioned at middle points of respective lower side of two red subpixels at row C5, column S2 and row C5, column S4 respectively). Accordingly, four vertexes of the rectangular sampling region for the green subpixel are respectively arranged such that the four vertexes are respective centers of four red subpixels at row C4, column S2, at row C7, column S2, at row C4, column S4, and at row C7, column S4 respectively. As shown in FIG. 19, the rectangular sampling region 3 of the green subpixel covers at least partial areas of 10 different theoretical pixel elements 1. In this example, the green subpixel G1 is used for the first view, and therefore the theoretical pixel elements belonging to the first view comprises 4 theoretical pixel elements in column S3 where the green subpixel G1 is arranged.

A rectangular sampling region may be set in this way so that during 3D displaying, the whole display area may be completely sampled, while the sampling will not be overlapped, thereby avoiding problem of picture distortion due to incomplete sampling or overlapping sampling.

In accordance with an embodiment of the present disclosure, optionally, luminance of a subpixel used for a view may be determined by: for each subpixel used for a view, determining overlapping areas between its corresponding preset sampling region and each theoretical pixel element covered by the preset sampling region and belonging to the view and color components for the color of the subpixel in said each theoretical pixel element; calculating products of overlapping areas corresponding to said each theoretical pixel element and the respective determined color components; and setting the luminance of the subpixel based on a sum of the products and an area of the preset sampling region.

According to an optional embodiment, after sampling by using a rectangular sampling region, luminance of corresponding subpixels may be set in any other suitable way.

Figure 20:
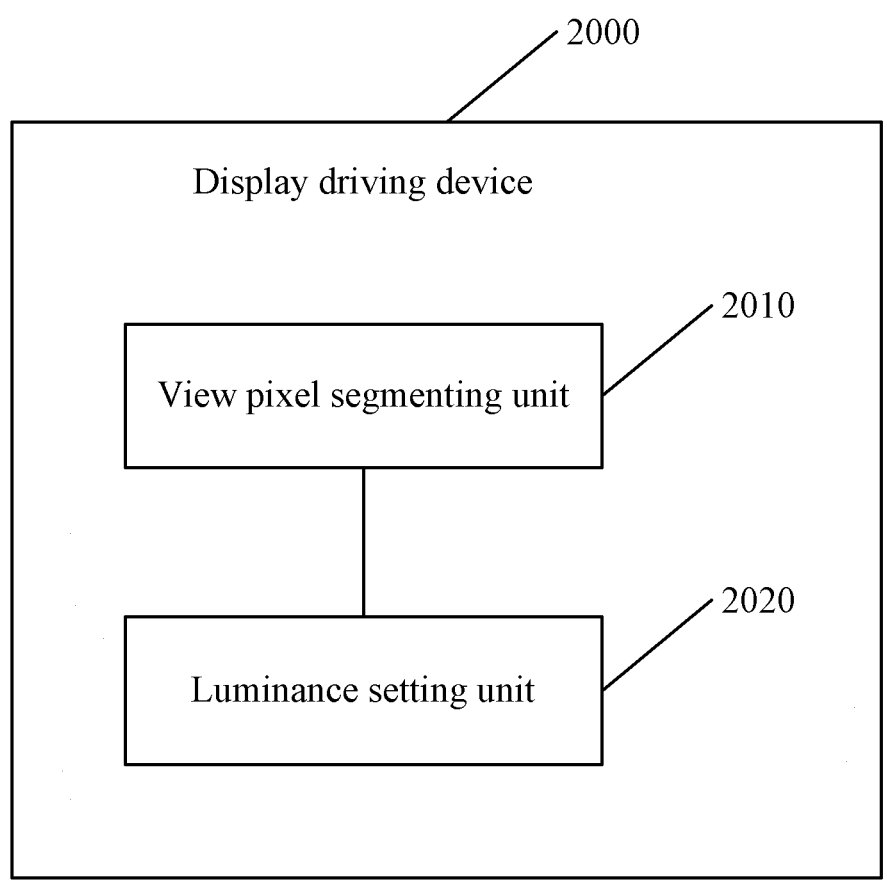
FIG. 20 is a schematic view illustrating a second exemplary display driving device in accordance with an embodiment of the present disclosure.

FIG. 20 is a schematic view illustrating a second exemplary display driving device 2000 in accordance with an embodiment of the present disclosure. The display driving device 2000 is used to drive a 3D display device. The 3D display device comprises a grating array and a pixel array according to the embodiment of the present disclosure. The subpixel groups in odd columns are first view pixel groups, that is, the subpixel groups are used for a first view; and the subpixel groups in even columns are second view pixel groups, that is, the subpixel groups are used for the second view. The grating array shields along a column direction a part of the first view pixel groups on a first side and a part of the second view pixel groups on a second side, wherein the first side and the second side are opposite sides. The display driving device 2000 comprises a second view pixel segmenting unit 2010 and a second luminance setting unit 2020. The second view pixel segmenting unit 2010 may be configured to segment the first view and the second view into a plurality of theoretical pixel elements respectively and determine color components for colors in each theoretical pixel element. The second luminance setting unit 2020 may be configured to, for each view, set luminance for each subpixel used for the view based on color components for color of the subpixel in theoretical pixel elements that are covered by a second preset sampling region corresponding to the subpixel and belong to the view.

Optionally, the second preset sampling region is a rectangular sampling region, wherein four middle points of four sides of the rectangular sampling region for the subpixel are arranged such that two middle points are in the same column direction as the center of the subpixel and at a distance of $$\frac{3}{2}a$$

from the center of the subpixel respectively; and the other two middle points are at the same row direction as the center of the subpixel and at a distance of b from the center of the subpixel respectively. Here a is length of a side of the subpixel in the column direction and b is length of the subpixel in the row direction.

It should be noted that the second view pixel segmenting unit may be configured to perform action(s) in step 1201 described with reference to FIG. 12 to FIG. 19. The second luminance setting unit may be configured to perform the action(s) in step 1202 described with reference to FIG. 12 to FIG. 19, which will not be described in more detail.

In accordance with an embodiment of the present disclosure, a display device is also provided. The display device comprises: a pixel array according to the present disclosure, such as a pixel array 100 as shown in FIG. 1.

Optionally, the display device further comprises: a display driving device in accordance with an embodiment of the present disclosure, such as the display driving device 1100, 2000 shown in FIG. 11 and/or in FIG. 20. Specifically, when the display device comprises a display driving device configured to drive a 2D display device, such as the display driving device 1100, the display device may be used for 2D displaying; when the display device comprises a display driving device configured to drive a 3D display device, such as the display driving device 2000, the display device may be used for 3D displaying. When the display device comprises both a display driving device which is configured to drive both 2D display device and 3D display device, the display device may be used for both 2D displaying and 3D displaying.

It should be appreciated that the above embodiments are only exemplary implementations employed to illustrate principles of the present disclosure, and the present disclosure will not be limited to those embodiments. Various modifications and improvements will occur to those skilled in the art without departing from the spirit and scope of the present disclosure. All of these modifications and improvements are within the scope of the present disclosure.

The invention claimed is:
1. A pixel array comprising a plurality of columns of subpixel groups, each column of subpixel groups comprising M×N subpixels, where N is the number of colors of subpixels, and M is an integer equal or greater than 3; and directions in which subpixels of the subpixel groups in odd columns and subpixels of the subpixel groups in even columns are twisted respectively being opposite in a column direction.

2. The pixel array according to claim 1, wherein shapes of the subpixels are parallelogram.

3. The pixel array according to claim 2, wherein acute angles of the parallelogram are in a range of 70 degree to 90 degree; or acute angles of the parallelogram are in a range of 82 degree to 85 degree.

4. The pixel array according to claim 2, wherein a length ratio of a side of a subpixel in the column direction to a side of the subpixel not in the column direction is $$\left[\frac{1}{2}, 1\right].$$

5. The pixel array according to claim 1, wherein there are a predetermined number of subpixels per unit pixel element area, and the predetermined number is lower than the number of colors of subpixels comprised in the pixel array.

6. The pixel array according to claim 1, wherein the value of N is 3, and the pixel array is a triangular pixel array.

7. The pixel array according to claim 1, wherein the subpixel groups in odd columns and the subpixel groups in even columns are staggered in the column direction.

8. A display driving method for driving a 2D display device comprising a pixel array, the pixel array comprising a plurality of columns of subpixel groups, each column of subpixel groups comprising M×N subpixels, where N is the number of colors of subpixels, and M is an integer equal or greater than 3; and directions in which subpixels of the subpixel groups in odd columns and subpixels of the subpixel groups in even columns are twisted respectively being opposite in a column direction, the display driving method comprising:

segmenting an image to be displayed into a plurality of theoretical pixel elements and determining color components for colors in each theoretical pixel element; and setting luminance for each subpixel in the pixel array based on color components for color of the subpixel in theoretical pixel elements that are covered by a preset sampling region corresponding to the subpixel.

9. The display driving method according to claim 8, wherein when length of a side of the subpixel in the column direction is a, the subpixel groups in odd columns and the subpixel groups in even columns are staggered by $$\frac{1}{2}a$$

in the column direction, and length of the subpixel in a row direction is b, the preset sampling region is a rhombic sampling region;

wherein four vertexes of the rhombic sampling region for the subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively.

10. The display driving method according to claim 8, wherein the step of setting luminance for each subpixel based on color components for color of the subpixel in theoretical pixel elements that are covered by a preset sampling region corresponding to the subpixel comprises:

for each subpixel, determining overlapping areas between its corresponding preset sampling region and each theoretical pixel element covered by the preset sampling region and color components for the color of the subpixel in said each theoretical pixel element; calculating products of overlapping areas corresponding to said each theoretical pixel element and respective determined color components; and setting the luminance of the subpixel based on a sum of the products and an area of the preset sampling region.

11. A display driving device for driving a display device comprising a pixel array according to claim 1, the display driving device comprising:

a first image pixel segmenting unit being configured to segment an image to be displayed into a plurality of theoretical pixel elements and determine color component for colors in each theoretical pixel element; and a first luminance setting unit being configured to set luminance for each subpixel in the pixel array based on color components for color of the subpixel in theoretical pixel elements that are covered by a preset sampling region corresponding to the subpixel.

12. The display driving device according to claim 11, wherein when length of a side of the subpixel in the column direction is a, the subpixel groups in odd columns and the subpixel groups in even columns are staggered by $$\frac{1}{2}a$$

in the column direction, and length of the subpixel in a row direction is b, the preset sampling region is a rhombic sampling region;

wherein four vertexes of the rhombic sampling region for the subpixel are arranged such that two vertexes are in the same column direction as center of the subpixel and at a distance of $$\frac{3}{2}a$$

from the center of the subpixel respectively, and the other two vertexes are in the same row direction as the center of the subpixel and at a distance of b from the center of the subpixel respectively.

13. A display driving method for driving a 3D display device comprising a grating array and a pixel array, the pixel array comprising a plurality of columns of subpixel groups, each column of subpixel groups comprising M×N subpixels, where N is the number of colors of subpixels, and M is an integer equal or greater than 3, and directions in which subpixels of the subpixel groups in odd columns and subpixels of the subpixel groups in even columns are twisted respectively being opposite in a column direction and the grating array being arranged to shield along the column direction a part of the first view pixel groups on a first side and a part of the second view pixel groups on a second side, the first side and the second side being opposite sides; the display driving methods comprising:

using the subpixel groups in odd columns for a first view to be displayed;

using the subpixel groups in even columns for a second view to be displayed;

segmenting the first view and the second view into a plurality of theoretical pixel elements respectively and determining color components for colors in each theoretical pixel element; and for each view, setting luminance for each subpixel used for the view based on color components for color of the subpixel in theoretical pixel elements that are covered by a preset sampling region corresponding to the subpixel and belong to the view.

14. The display driving method according to claim 13, wherein length of a side of the subpixel in the column direction is a, and length of the subpixel in a row direction is b, the preset sampling region is a rectangular sampling region;

wherein four middle points of four sides of the rectangular sampling region for the subpixel are arranged such that two middle points are in the same column direction as center of the subpixel and at a distance of $$\frac{3}{2}a$$

from the center of the subpixel respectively, and the other two middle points are in the same row direction as the center of the subpixel and at a distance of b from the center of the subpixel respectively.

15. The display driving method according to claim 13, wherein the step of, for each view, setting luminance for each subpixel used for the view based on color components for color of the subpixel in theoretical pixel elements that are covered by a preset sampling region corresponding to the subpixel and belong to the view comprises:

for each subpixel used for a view, determining overlapping areas between its corresponding preset sampling region and each theoretical pixel element covered by the preset sampling region and belonging to the view and color components for the color of the subpixel in said each theoretical pixel element; calculating products of overlapping areas corresponding to said each theoretical pixel element and the respective determined color components; and setting the luminance of the subpixel based on a sum of the products and an area of the preset sampling region.

16. A display driving device for driving a 3D display device comprising a grating array and a pixel array according to claim 1, the subpixel groups in odd columns being first view pixel groups used for a first view to be displayed; the subpixel groups in even columns are second view pixel groups used for a second view to be displayed;

the grating array being configured to shield along the column direction a part of the first view pixel groups on a first side and a part of the second view pixel groups on a second side, the first sides and the second side being opposite sides;

the display driving device comprising:

a second view pixel segmenting unit being configured to segment the first view and the second view into a plurality of theoretical pixel elements respectively and determine color components for colors in each theoretical pixel element;

a second luminance setting unit being configured to, for each view, set luminance for each subpixel used for the view based on color components for color of the subpixel in theoretical pixel elements that are covered by a preset sampling region corresponding to the subpixel and belong to the view.

17. The display driving device according to claim 16, wherein length of a side of the subpixel in the column direction is a, and length of the subpixel in a row direction is b, the preset sampling region is a rectangular sampling region;

wherein four middle points of four sides of the rectangular sampling region for the subpixel are arranged such that two middle points are in the same column direction as center of the subpixel and at a distance of $$\frac{3}{2}a$$

from the center of the subpixel respectively, and the other two middle points are in the same row direction as the center of the subpixel and at a distance of b from the center of the subpixel respectively.

18. A display device, comprising a pixel array according to claim 1.

19. The display device according to claim 18, wherein the display device further comprises a display driving device for driving the display device, the display driving device comprising:

a first image pixel segmenting unit being configured to segment an image to be displayed into a plurality of theoretical pixel elements and determine color component for colors in each theoretical pixel element; and a first luminance setting unit being configured to set luminance for each subpixel in the pixel array based on color components for color of the subpixel in theoretical pixel elements that are covered by a preset sampling region corresponding to the subpixel.

20. The display device according to claim 18, wherein the display device further comprises a grating array and a display driving device for driving the display device, the subpixel groups in odd columns being first view pixel groups used for a first view to be displayed; the subpixel groups in even columns are second view pixel groups used for a second view to be displayed;

the grating array being configured to shield along the column direction a part of the first view pixel groups on a first side and a part of the second view pixel groups on a second side, the first sides and the second side being opposite sides;

the display driving device comprising:

a second view pixel segmenting unit being configured to segment the first view and the second view into a plurality of theoretical pixel elements respectively and determine color components for colors in each theoretical pixel element;

a second luminance setting unit being configured to, for each view, set luminance for each subpixel used for the view based on color components for color of the subpixel in theoretical pixel elements that are covered by a preset sampling region corresponding to the subpixel and belong to the view.

\* \* \* \* \*